(12) United States Patent
Ramdass et al.

(10) Patent No.: US 9,280,289 B1
(45) Date of Patent: Mar. 8, 2016

(54) DETECTING MISALIGNMENT OF VIRTUALIZED DATA

(75) Inventors: Dennis Ramdass, Mountain View, CA (US); Stephanie Zhimao He, Fremont, CA (US)

(73) Assignee: NETAPP, INC., Sunnyvale, CA (US)

( * ) Notice: Subject to any disclaimer, the term of this patent is extended or adjusted under 35 U.S.C. 154(b) by 1131 days.

(21) Appl. No.: 13/173,452

(22) Filed: Jun. 30, 2011

(51) Int. Cl.
*G06F 12/00* (2006.01)
*G06F 3/06* (2006.01)

(52) U.S. Cl.
CPC .............. *G06F 3/061* (2013.01); *G06F 3/0665* (2013.01); *G06F 3/0676* (2013.01)

(58) Field of Classification Search
CPC ....... G06F 3/064; G06F 3/061; G06F 3/0665; G06F 3/0676
USPC ......................................................... 711/201
See application file for complete search history.

(56) References Cited

U.S. PATENT DOCUMENTS

| | | | | |
|---|---|---|---|---|
| 6,594,722 B1 * | 7/2003 | Willke et al. | ................... | 710/313 |
| 8,171,201 B1 * | 5/2012 | Edwards, Sr. | ..................... | 711/6 |
| 8,185,684 B1 * | 5/2012 | Naftel | ................ | 711/6 |
| 8,532,397 B1 * | 9/2013 | Thakkar et al. | ............... | 382/205 |
| 8,578,126 B1 * | 11/2013 | Gaonkar | ................. | G06F 3/061 |
| | | | | 711/201 |
| 8,793,465 B1 * | 7/2014 | Forgette | ................... | G06F 12/02 |
| | | | | 711/154 |
| 2008/0189700 A1 * | 8/2008 | Schmidt et al. | .................... | 718/1 |
| 2012/0278382 A1 * | 11/2012 | Faith | ....................... | G06F 3/064 |
| | | | | 709/203 |

OTHER PUBLICATIONS

VMware. Recommendations for Aligning VMFS Partitions. WMware Infrastructure 3, Jul. 30, 2009 [online], [retrieved on Mar. 30, 2015]. Retrieved from the Internet <URL: https://www.vmware.com/pdf/esx3_partition_align.pdf>.*
Kevin. Why Disk Alignment is important (and how to fix a misaligned VM). Blue Shift Blog, Nov. 12, 2010 [online], [retrieved on Mar. 30, 2015]. Retrieved from the Internet <URL: http://www.blueshiftblog.com/?p=300>.*

* cited by examiner

*Primary Examiner* — Larry Mackall
(74) *Attorney, Agent, or Firm* — Klein, O'Niell & Singh, LLP

(57) ABSTRACT

One or more techniques and/or systems are provided for detecting misalignment between a virtual data format and an underlying data format. A virtual data object, such as a virtual machine, may be stored within a storage device using an underlying data format. The virtual data object may comprise one or more virtual data structures, such as a virtual partition. The virtual partition may be stored within the virtual data object according to a virtual data format. The virtual data format may be compared with the underlying data format to determine whether the virtual data structure is misaligned within the storage device. Such misalignment may lead to virtual data blocks of the virtual data structure overlapping underlying data blocks, which may degrade (e.g., I/O) performance. Accordingly, one or more misaligned virtual data structures may be realigned within the storage device to address misalignment and/or improve performance.

20 Claims, 9 Drawing Sheets

DETECTING MISALIGNMENT OF VIRTUALIZED DATA

FIELD

The instant disclosure pertains to detecting misalignment between a virtual data format of virtual data and an underlying data format of data storage upon which the virtual data is stored.

BACKGROUND

Virtualization allows, among other things, many computing environments, such as general desktop environments, database servers, web development platforms, etc., to be implemented through software as virtual machines within host computing devices. A virtual machine may comprise its own file structure, virtual hard disks, partitions, operating system, applications, data files and/or configuration. As such, the virtual machine may function as a self-contained computing environment. The virtual machine may be an abstraction of the underlying hardware resources (e.g., a virtual machine may be stored as one or more virtual data objects within physical storage). That is, the virtual machine may be a software implementation of a physical computing machine that has normal operational functionality of the physical computing machine. For example, a host computing device may comprise virtual machine host software (e.g., a hypervisor) configured to host and manage virtual machines. The virtual machine host software may allow a user to interface to and interact with a hosted virtual machine. For example, the user may interact with the guest operating system and/or applications of the hosted virtual machine through the virtual machine host software.

A virtual machine may be stored as one or more virtual data objects within physical storage and/or virtualized storage, such as a logical unit number (LUN), of an underlying storage device. A virtual data object may comprise virtual storage, such as a virtual hard disk (e.g., a virtual machine disk format (.vmdk), a virtual hard disk (.vdh) file format, etc.). The virtual storage may comprise virtual machine data, such as a file system guest operating system and/or user data of the virtual machine. The virtual storage may be a level of abstraction from the underlying storage because the virtual storage may store the virtual machine data according to a virtual data format that may not be dependent upon an underlying data format of the underling storage. For example, a guest operating system of a virtual machine may store a user created text document according to a virtual data format within a virtual hard disk of a virtual data object (e.g., the user created text document may be stored within virtual data blocks of 512 bytes). The virtual data format may be independent of an underlying data format used by a storage device to store the virtual data object (e.g., the virtual data object may be stored within physical data blocks of 4096 bytes). That is, the virtual data format (e.g., how virtual machine data is stored within a virtual data object) may be a level of abstraction from an underlying data format (e.g., how the virtual data object is stored within an underlying physical storage device).

Virtualization also allows for storage virtualization. For example, a virtual volume may be created from various available portions of one or more physical storage locations (e.g., a virtual volume may be comprised of space from a first physical disk, a second physical disk, etc.). Thus, the virtual volume may not be "tied" to a particular storage device, and can be said to include a layer of abstraction or virtualization. Further, a virtual volume may comprise one or more logical unit numbers (LUNs). LUNs may allow disparate memory located within data storage to be grouped as a data storage unit. As such, a LUN may be characterized as comprising a virtual disk or drive upon which data within a virtual volume may be stored within the aggregate. For example, a LUN may be referred to as a virtual drive, such that it may emulate a hard drive from a general purpose computer, while the LUN actually comprises one or more data storage blocks in various physical storage devices and/or volumes. In this way, a LUN may store data according to a virtual data format, which may be independent from an underlying data format used by a storage device to store the LUN.

Unfortunately, storing virtualized data, such as a virtual machine or a LUN, within underlying data storage may result in misalignment. For example, a guest operating system of a virtual machine may store virtual machine data according to a virtual data format within the virtual data object (e.g., the virtual data format may specify that a virtual file system of the virtual machine stores data within 512 byte blocks, and a first virtual hard drive partition starts at an offset of 63 blocks within the virtual data object). However, the virtual data object may be stored within a storage device (e.g., within physical storage and/or a LUN) according to an underlying data format (e.g., the virtual data object may be stored within physical data blocks of 4096 bytes). If the virtual data format and the underlying data format align, then virtual data blocks may be stored within corresponding underlying storage data blocks without overlapping into additional underlying storage data blocks (e.g., virtual data blocks may span no more than one underlying storage data block). If the virtual data format and the underlying data format do not align, however, then virtual data blocks may end up being stored across one or more additional underlying storage data blocks (e.g., a virtual data block may span more than one underlying storage block). Thus, if a virtual data block is misaligned, then an I/O operation for the virtual data block may entail accessing more than one underlying storage data block (e.g., a first portion of the virtual data block may be read from a first underlying storage data block and a second portion of the virtual data block may be read from a second underlying storage data block). Such additional I/O operations may result in performance degradation. For example, access to a guest operating system and/or user data of a virtual machine may take twice as long because more than one I/O operation to underlying data storage may be performed to access a single virtual data block due to the misalignment.

SUMMARY

The disclosure relates to one or more techniques and/or systems that detect misalignment between a virtual data format and an underlying data format. Misalignment may be detected between a virtual data format used to store a virtual data structure within a virtual data object and an underlying data format used to store the virtual data object within an underlying storage device. In particular, metadata within the virtual data object may be queried to determine the virtual data format of the virtual data structure within the virtual data object (e.g., the virtual data structure may be opened and read using a virtual machine application programming interface so that one or more bytes, for example, of data within the virtual data structure may be searched for metadata describing how virtualized data is stored within the virtual data structure). The metadata, for example, may comprise a master boot record table, a global unique ID partition table, a range of bytes within the virtual data object (e.g., a first or last 512 bytes) and/or other metadata within the virtual data object that may describe how virtual data is stored within the virtual data object. The virtual data format may comprise a virtual block size, a virtual offset and/or other formatting information of the virtual data structure.

The virtual data object may be stored within a storage device, such as an underlying physical storage device and/or a LUN, using an underlying data format. The underlying data format may correspond to an underlying block size and/or other formatting information relating to how data is stored on the storage device. To detect misalignment between the virtual data format and the underlying data format, the virtual block size and the virtual offset, for example, may be compared with the underlying data format. For example, a product of the virtual block size and the virtual offset may be determined, and then compared to the underlying block size of the underlying data format to determine whether a remainder is produced (e.g., a modulus (MOD) operation may be performed to determine whether a remainder is produced from a division operation of the product and the underlying block size). If a remainder is produced, then misalignment may be detected. That is, the remainder may indicate that virtual data blocks of the virtual data structure may not align within underlying data blocks of the storage device.

In one example of detecting misalignment, a virtual management platform (e.g., a hypervisor) may provide a virtualization discovery report indicating that the virtual data object is associated with virtual data (e.g., the virtualization discovery report may indicate that the virtual data object is a virtual hard disk of a virtual machine). If the virtual data object corresponds to a virtual machine, then a virtual machine application programming interface may be used to open and read the virtual data object. It may be appreciated that the virtual data object may be opened and read regardless of whether the virtual machine is in a running state, a shutdown state, and/or another state. Once opened, the virtual data object may be scanned for metadata describing the virtual data format (e.g., the virtual data object may be read byte by byte to locate metadata, such as a master boot partition table, that may describe how the virtual data structure is stored within the virtual data object). Once located, the metadata may be queried (e.g., searched for particular information, such as virtual block size, virtual offset, and/or other formatting information associated with the virtual data structure). In this way, the underlying data format may be determined. The underlying data format describing how the virtual data object is stored within the storage device may be determined by querying storage configuration data (e.g., a master boot record of the storage device, a file system configuration file of the storage device, etc.) for formatting information associated with the storage device. In this way, misalignment may be detected by comparing the virtual data format and the underlying data format. If misalignment is detected, then the virtual data structure and/or the virtual data object may be moved (e.g., byte by byte data transfer) to a new a starting location (e.g., a new starting block, a new starting offset, etc.) within the storage device so that alignment is achieved (e.g., a computational comparison of the virtual data format and the adjusted underlying data format does not produce a remainder).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
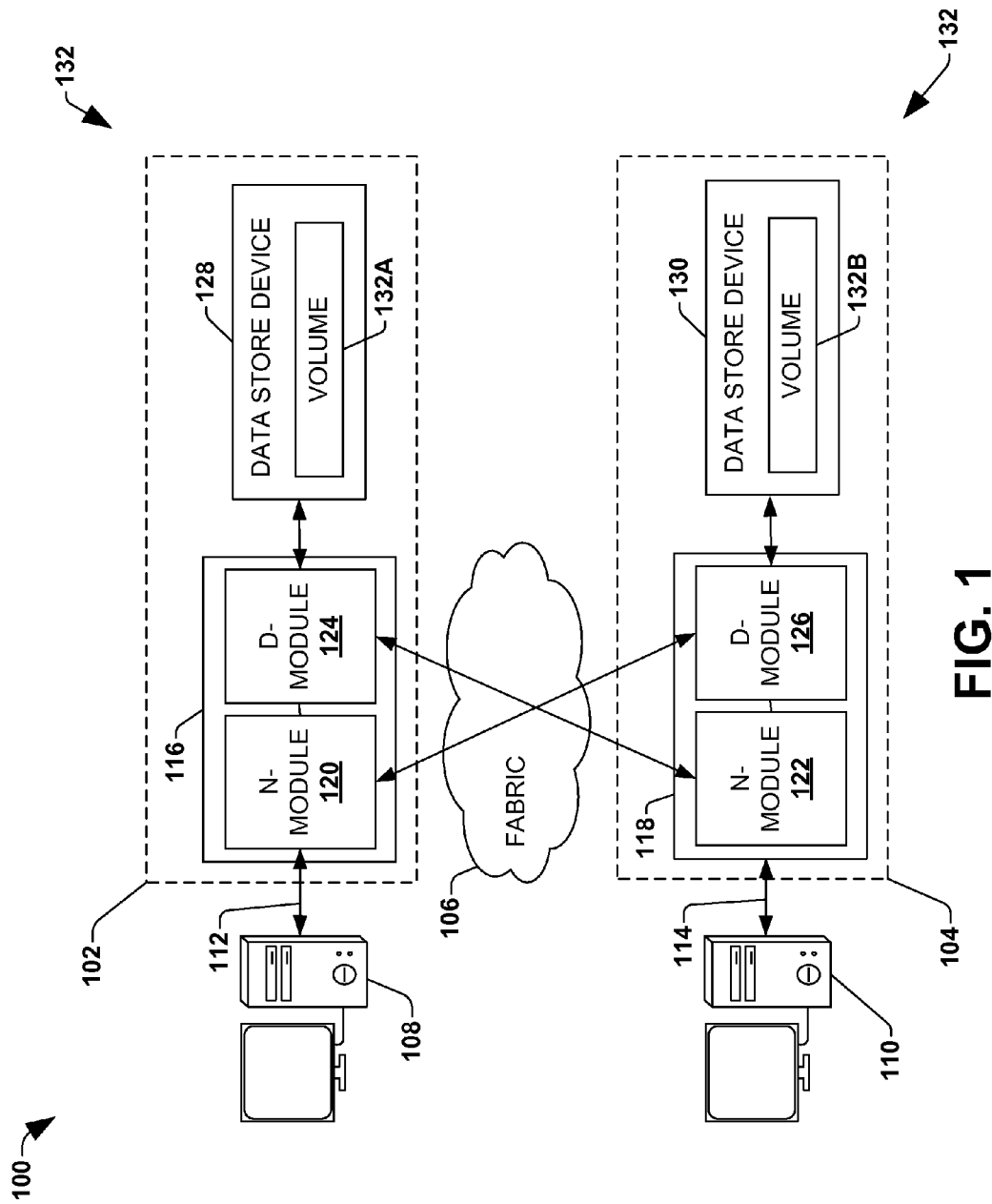
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

Virtualization allows computing environments and/or data storage to be abstracted away from the underlying storage devices upon which they may reside (e.g., so that multiple virtual computing environments may be established on a single physical device for various testing and/or other purposes). For example, a computing environment may be virtualized into a virtual machine, and data storage may be virtualized into a logical unit number (LUN) by a hypervisor. Unfortunately, misalignment may occur between virtual data and an underlying storage device that comprises the virtual data. For example, a virtual hard disk partition misaligned with an underlying storage device may cause virtual data blocks of the virtual hard disk partition to span more than one underlying data block of the underlying storage device. Such misalignment may reduce performance of the virtual hard disk partition because additional I/O operations may have to be performed to access virtual data (e.g., two I/O operations may need to be performed to access a single virtual data block spanning two underlying data blocks). For example, a database, an email server and/or other applications hosted by a misaligned virtual machine may experience performance degradation (e.g., speed, overhead required, resources consumed, etc.) of two-times or more compared to an aligned virtual machine. Accordingly, it may be advantageous to detect misalignment between a virtual data format of virtual data and an underlying data format of a storage device comprising the virtual data (e.g., to facilitate (re)alignment). Such misalignment may be corrected by adjusting how the virtual data object is stored within the underlying storage. Correcting misalignment may reduce unnecessary I/O operations to additional underlying data blocks. In this way, access to the virtual data object may be improved by reducing access time to the virtual data within the virtual data object.

Figure 2:
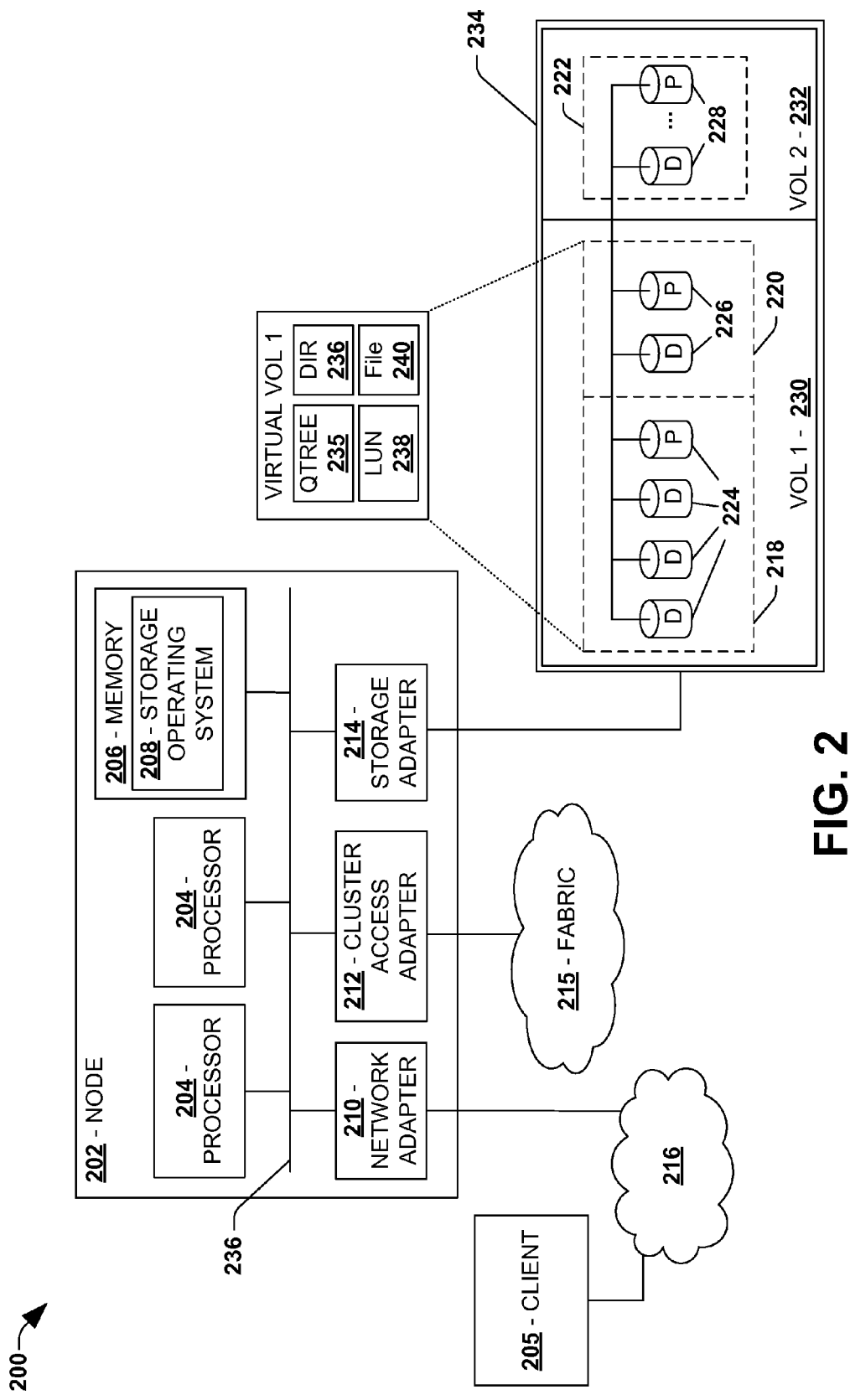
FIG. 2 is a component block diagram illustrating an example data storage system in accordance with one or more of the provisions set forth herein.

To provide context for where misalignment between a virtual data format and an underlying data format may occur, be detected and/or corrected as provided herein, FIG. 1 illustrates a clustered network environment 100, and FIG. 2 illustrates an embodiment of a data storage system that may be implemented to store and manage data in this clustered network environment, including cluster backup data and/or node backup data. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that virtualized data, such as a virtual machine and/or a logical unit number (LUN), may be implemented within environment 100. For example, one or more virtual machines may be stored as virtual data objects within one or more of the data storage devices 128, 130. One or more of the data storage devices 128, 130 may store a virtual data object according to an underlying data format. One or more of the nodes 116, 118, for example, may be configured as host computing devices for the virtual machine. In particular, one or more of nodes 116, 118 may comprise virtual machine host software that may host a virtual machine stored on one or more of data storage devices 128, 130. One or more of the nodes 116, 118 may allow one or more clients 108, 110 to interface with the hosted virtual machine (e.g., access a guest operating system, user data, and/or applications of the hosted virtual machine). Unfortunately, virtual data structures within the virtual data object may be misaligned within one or more of the data storage devices 128, 130. Accordingly, a comparison component and/or a realignment component may be implemented within environment 100 (e.g., one or more of such components may be implemented on one or more of clients 108, 110, nodes 116, 118 and/or on other computing devices not illustrated that may have access to data storage devices 128, 130). The comparison component may be configured to detect misalignment, while the realignment component may be configured to correct misalignment. The comparison component may utilize a virtual machine management platform (e.g., a hypervisor within environment 100 and/or one or more of virtual machine host software on nodes 116, 118, etc.) to discover that the virtual data object is associated with a virtual machine (e.g., a virtualization discovery report may be provided by the virtual machine management platform). Additionally, the comparison component may utilize a virtual machine application programming interface (e.g., an API configured to read and open one or more virtual machines located within environment 100, such as on one or more of nodes 116, 118) to open and read the virtual data object for metadata indicating how virtual data structures are stored within the virtual data object.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that virtualized data, such as a virtual machine and/or a logical unit number (LUN), may be implemented within data storage system 200. For example, one or more virtual machines may be stored as virtual data objects within data storage device 234 (e.g., or one or more data storage devices). The data storage devices 234 may store a virtual data object according to an underlying data format. Node 202 may, for example, be configured as host computing devices for the virtual machine. In particular, node 202 may comprise virtual machine host software that may host a virtual machine stored on data storage device 234. The node 202 may allow client 205 to interface with the hosted virtual machine (e.g., access a guest operating system, user data and/or applications of the hosted virtual machine, etc.). Unfortunately, virtual data structures within the virtual data object may be misaligned within the data storage device 234. Accordingly, a comparison component and/or a realignment component may be implemented (e.g., one or more of such components may be implemented on one or more of client 205, node 202 and/or on other computing devices not illustrated that may have access to data storage device 234). It may be appreciated that one example of implementing a comparison component is illustrated and described relative to FIG. 5, and that one example of implementing a realignment component is illustrated and described relative to FIG. 6. The comparison component may be configured to detect misalignment, while the realignment component may be configured to correct misalignment. The comparison component may utilize a virtual machine management platform (e.g., a hypervisor associated with data storage system 200 and/or virtual machine host software on node 202, etc.) to discover that the virtual data object is associated with a virtual machine (e.g., a virtualization discovery report may be provided by the virtual machine management platform). Additionally, the comparison component may utilize a virtual machine application programming interface (e.g., an API configured to read and open virtual machines associated with data storage system 200, such as node 202) to open and read the virtual data object for metadata indicating how virtual data structures are stored within the virtual data object.

Figure 3:
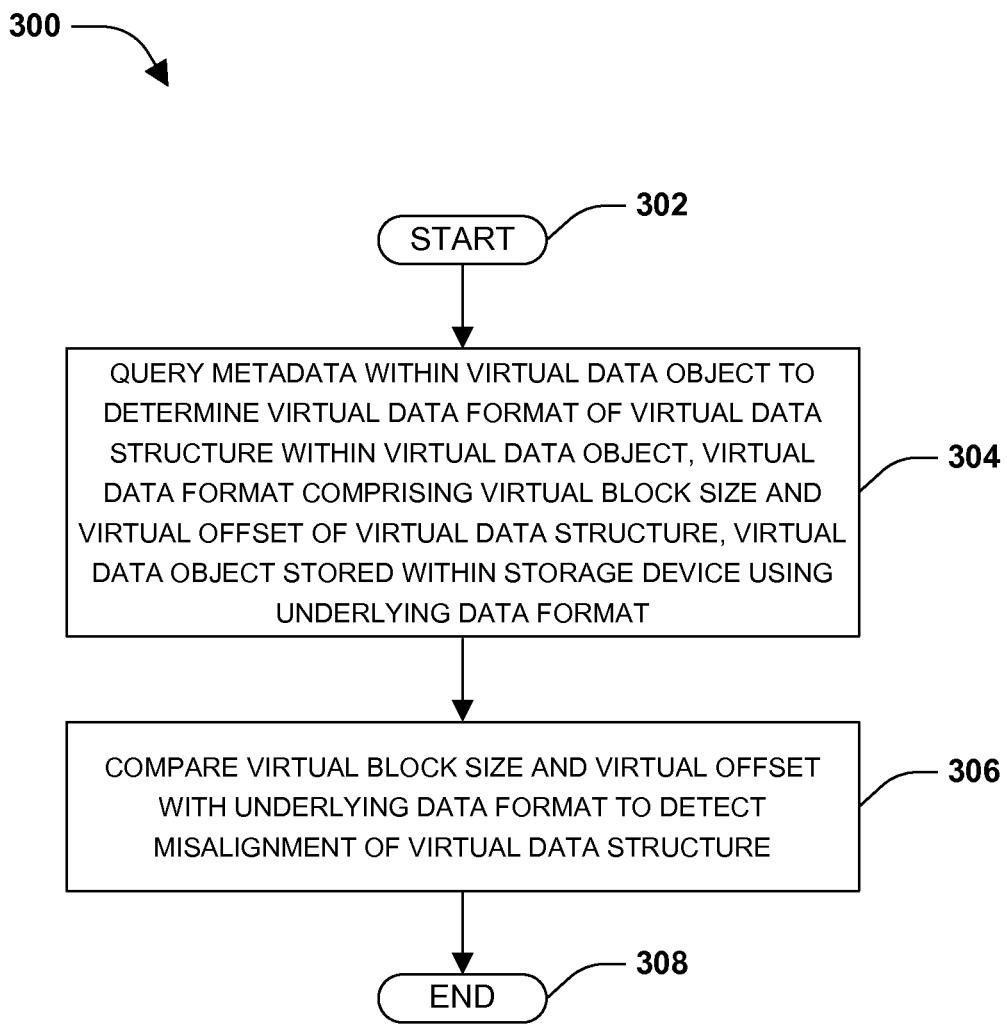
FIG. 3 is a flow chart illustrating an exemplary method of detecting misalignment between a virtual data format and an underlying data format.

One embodiment of detecting misalignment between a virtual data format and an underlying data format is illustrated by an exemplary method 300 in FIG. 3. At 302, the method starts. A virtual data object, such as a virtual machine and/or a logical unit number (LUN), may be stored within a storage device using an underlying data format (e.g., a virtual machine may be stored on a LUN of the storage device, a virtual machine may be stored on physical storage of the storage device, a LUN may be stored on physical storage of the storage device, etc.). The underlying data format may correspond to an offset, a data block size and/or other formatting information related to how the virtual data object is stored within the storage device.

Figure 7:
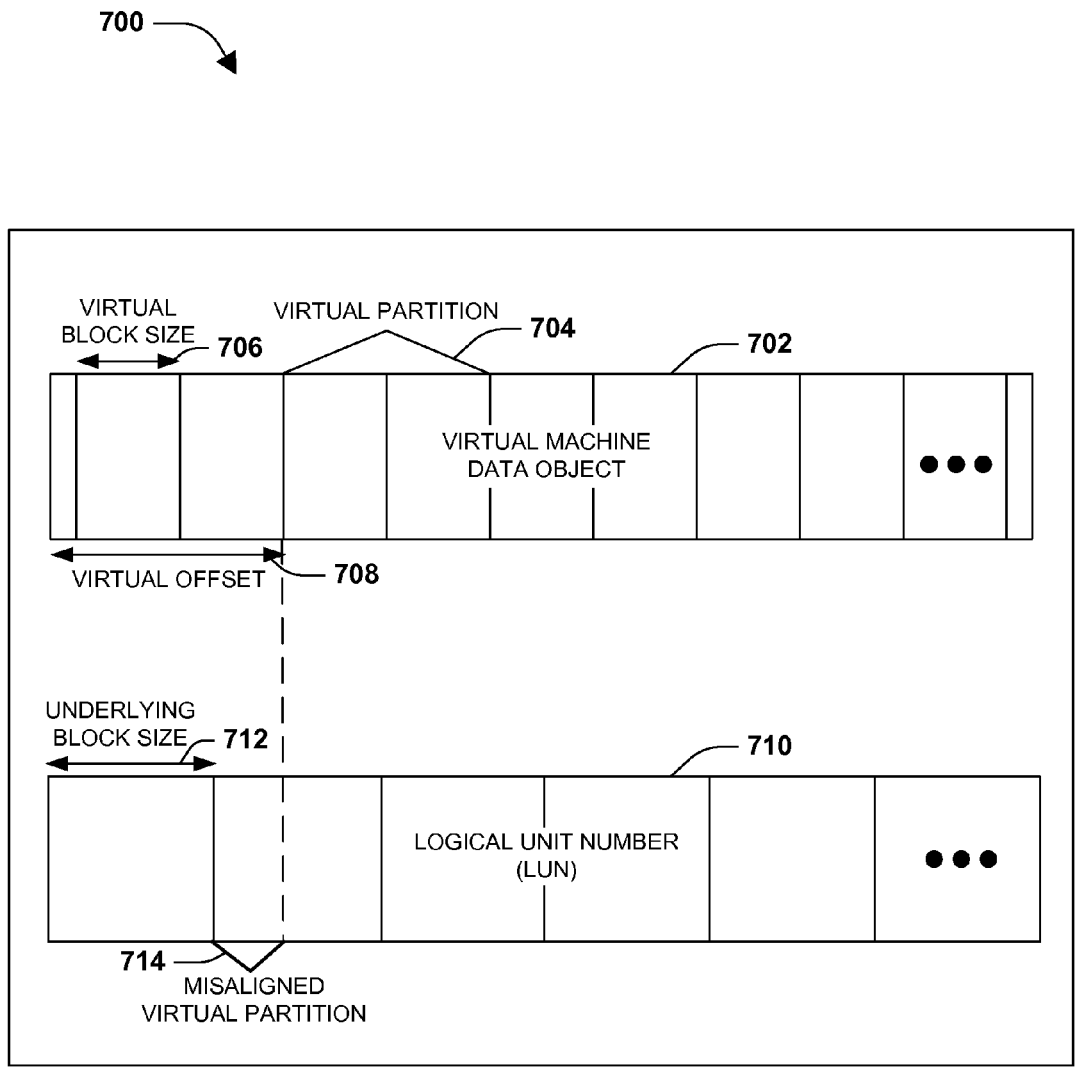
FIG. 7 is an example of a virtual partition misaligned with a logical unit number (LUN) mapped to a storage device.
Figure 8:
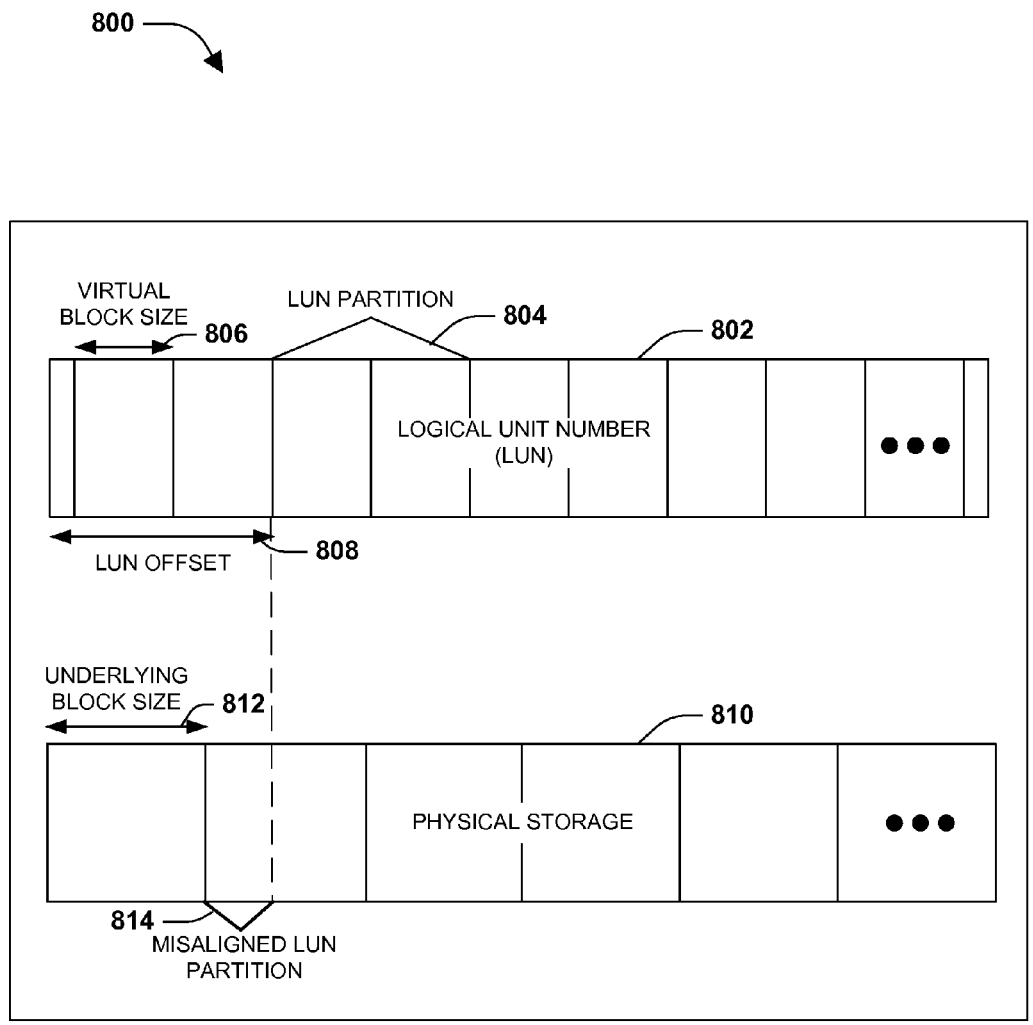
FIG. 8 is an example of a LUN partition misaligned with physical storage of a storage device.

The virtual data object may comprise one or more virtual data structures, such as a virtual partition of a virtual machine and/or a LUN partition of a LUN (e.g., as illustrated in FIG. 7 and FIG. 8). A virtualization management platform may be used to discover the virtual data object (e.g., a virtual machine management platform may provide a virtualization discovery report specifying that a virtual machine data object is associated with a virtual machine). An application programming interface on the storage device may be invoked to open and/or read the virtual data object (e.g., a virtual machine application programming interface may allow a virtual machine data object to be opened and/or read regardless of the state of the corresponding virtual machine). In this way, the virtual data object may be opened and searched for metadata that may describe how a virtual data structure of the virtual data object is stored within the virtual data object (e.g., the first and/or last 512 bytes of the virtual data object may be read to determine a virtual data format of the virtual data structure, a master boot record within the virtual data object may be searched and/or a global unique ID partition table may be searched, etc.). In one example, a metadata data structure (e.g., table) within a first portion of the virtual data object may be queried. However, the metadata data structure may specify that virtual data format information may be located at second portion within the virtual data object. Thus, the second portion may be queried to determine the virtual data format. In this way, multiple layers of indirection within the virtual data object may be navigated to determine the metadata.

At 304, metadata within the virtual data object may be queried to determine the virtual data format describing how the virtual data structure is stored within the virtual data object. The virtual data format may comprise a virtual block size (e.g., a size of virtual data blocks of the virtual data object within which virtual data of the virtual data structure may be stored), a virtual offset (e.g., a starting virtual data block of the virtual data object at which the virtual data structure begins), and/or other formatting information. It may be appreciated that an example of a virtual offset and/or a virtual block size is illustrated and described relative to FIG. 5 (e.g., virtual offset (1) 512, virtual offset (2) 514, virtual block size 532, etc.).

At 306, the virtual block size and the virtual offset may be compared with the underlying data format to detect misalignment of the virtual data structure in relation to the storage device. In one example, a product of the virtual block size and the virtual offset may be determined, and then compared (e.g., a MOD operation may be performed) to an underlying block size of the underlying data format to determine whether a remainder is produced. For example, virtual data of the virtual data structure may be stored within 512 byte virtual data blocks within the virtual data object, the virtual data structure may start at a virtual offset of 63 blocks within the virtual data object, and the storage device may store data within 4096 byte underlying data blocks within the storage device. Thus, a product of 512 and 63 may be determined, and then compared to 4096 which produces a remainder, which may indicate that the virtual data structure may be misaligned with the underlying storage device. That is, the virtual data format and the underlying data format may be misaligned. If misalignment is detected, then a notification of the misalignment may be provided (e.g., a notification may be provided to an administrator of the storage device so that a data alignment utility may be used to correct the misalignment). For example, if misalignment is detected, then the virtual data structure and/or the virtual data object may be realigned to a new starting block position within the storage device to match the underlying format. For example, a data move operation may be performed upon the virtual data object so that the virtual data object starts at an underlying data block that would not result in misalignment (e.g., the virtual data format compared with the realigned underlying data format does not produce a remainder). It may be appreciated that other actions may be performed to correct the misalignment (e.g., the virtual data structure may be moved to a new starting block position within the virtual data object).

It may be appreciated that the virtual data object may comprise one or more virtual data structures, such that one or more of the one or more virtual data structures may be misaligned. In one example, the metadata within the virtual data object may be queried to determine at least two virtual data structures. For respective virtual data structures, a virtual data format comprising a virtual block size and a virtual offset of a virtual data structure may be determined. The virtual data formats may be compared with the underlying data format to detect and/or correct misalignment.

In one example of detecting misalignment, misalignment may be detected between a virtual machine and physical storage of a storage device, where the virtual machine is stored within the physical storage. In particular, the virtual data object may comprise a virtual machine data object (e.g., a .vdh data format, a .vmdk data format, etc.) associated with the virtual machine. The virtual data structure may comprise a virtual partition of the virtual machine, such as a virtual hard disk partition. In this way, a virtual data format of the virtual partition may be compared with an underlying data format of the physical storage to detect misalignment.

In another example of detecting misalignment, misalignment may be detected between a virtual machine and a LUN mapped to the physical storage, where the virtual machine is stored within the LUN. In particular, the virtual data object may comprise a virtual machine data object (e.g., a .vdh data format, a .vmdk data format, etc.) associated with the virtual machine. The virtual data structure may comprise a virtual partition of the virtual machine, such as a virtual hard disk partition. In this way, a virtual data format of the virtual partition may be compared with an underlying data format of the LUN to detect misalignment.

In another example of detecting misalignment, misalignment may be detected between a LUN and physical storage of a storage device, where the LUN is stored within the physical storage. In particular, the virtual data object may comprise the LUN. The virtual data structure may comprise a LUN partition. In this way, a virtual data format of the LUN partition may be compared with an underlying data format of the physical storage to detect misalignment. At 308, the method ends.

Figure 4:
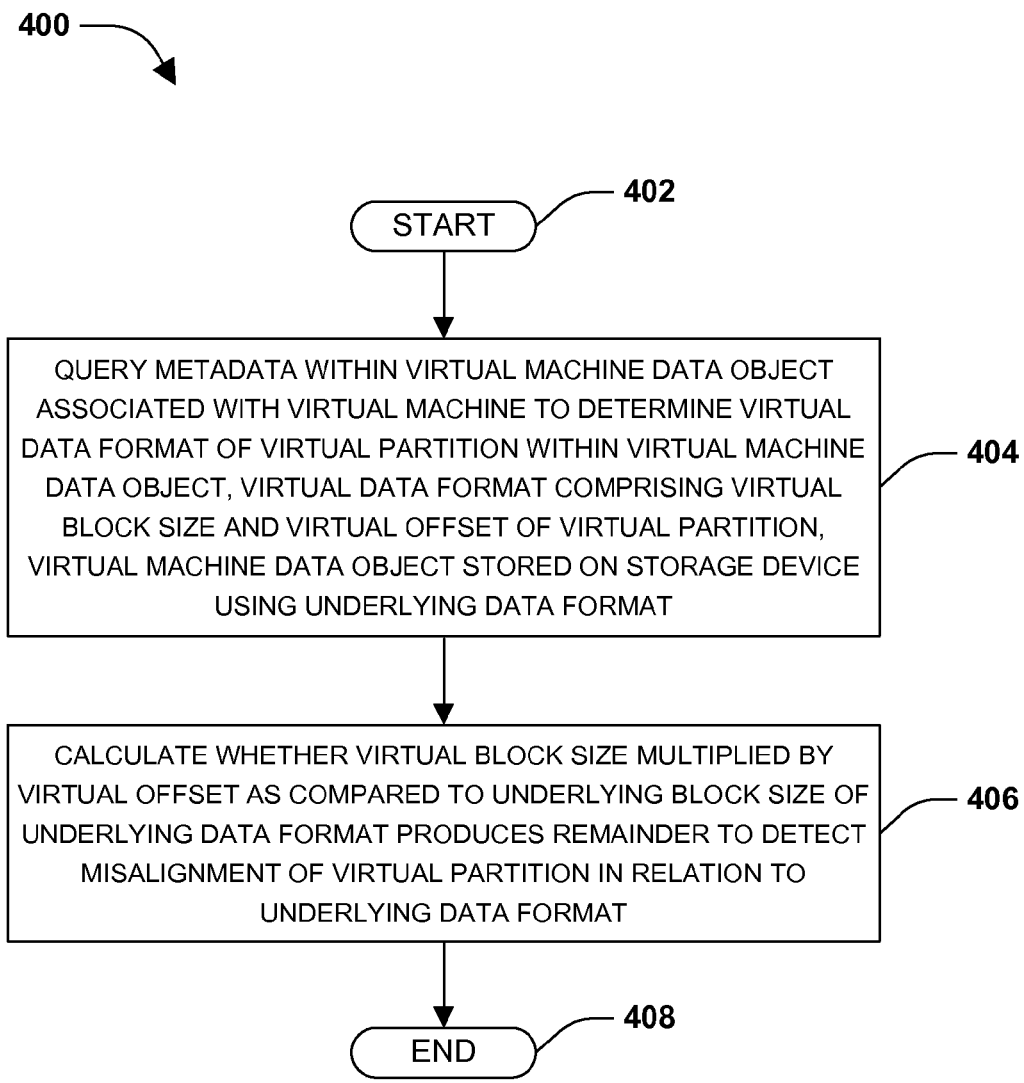
FIG. 4 is a flow chart illustrating an exemplary method of detecting misalignment between a virtual data format and an underlying data format.

One embodiment of detecting misalignment between a virtual data format and an underlying data format is illustrated by an exemplary method 400 in FIG. 4. At 402, the method starts. At 404, metadata within a virtual machine data object associated with a virtual machine may be queried to determine a virtual data format of a virtual partition stored within the virtual machine data object. In one example, the virtual partition may be a partition of a virtual disk of the virtual machine. The virtual data format may describe how the virtual partition is stored within the virtual machine data object. For example, the virtual data format may comprise a virtual block size and a virtual offset of the virtual partition.

The virtual machine data object may be stored on a storage device using an underlying data format. The virtual data format may be compared with the underlying data format to detect misalignment of the virtual partition in relation to the underlying data format of the storage device. At 406, a product of the virtual block size and the virtual offset may be determined, and then compared (e.g., a MOD operation may be performed) to an underlying block size of the underlying data format to determine whether a remainder is produced. Misalignment of the virtual partition in relation to the underlying data format may be detected if a remainder is produced. If misalignment is detected, then the virtual partition may be realigned to a new starting block position within the storage device to match the underlying data format. At 408, the method ends.

Figure 5:
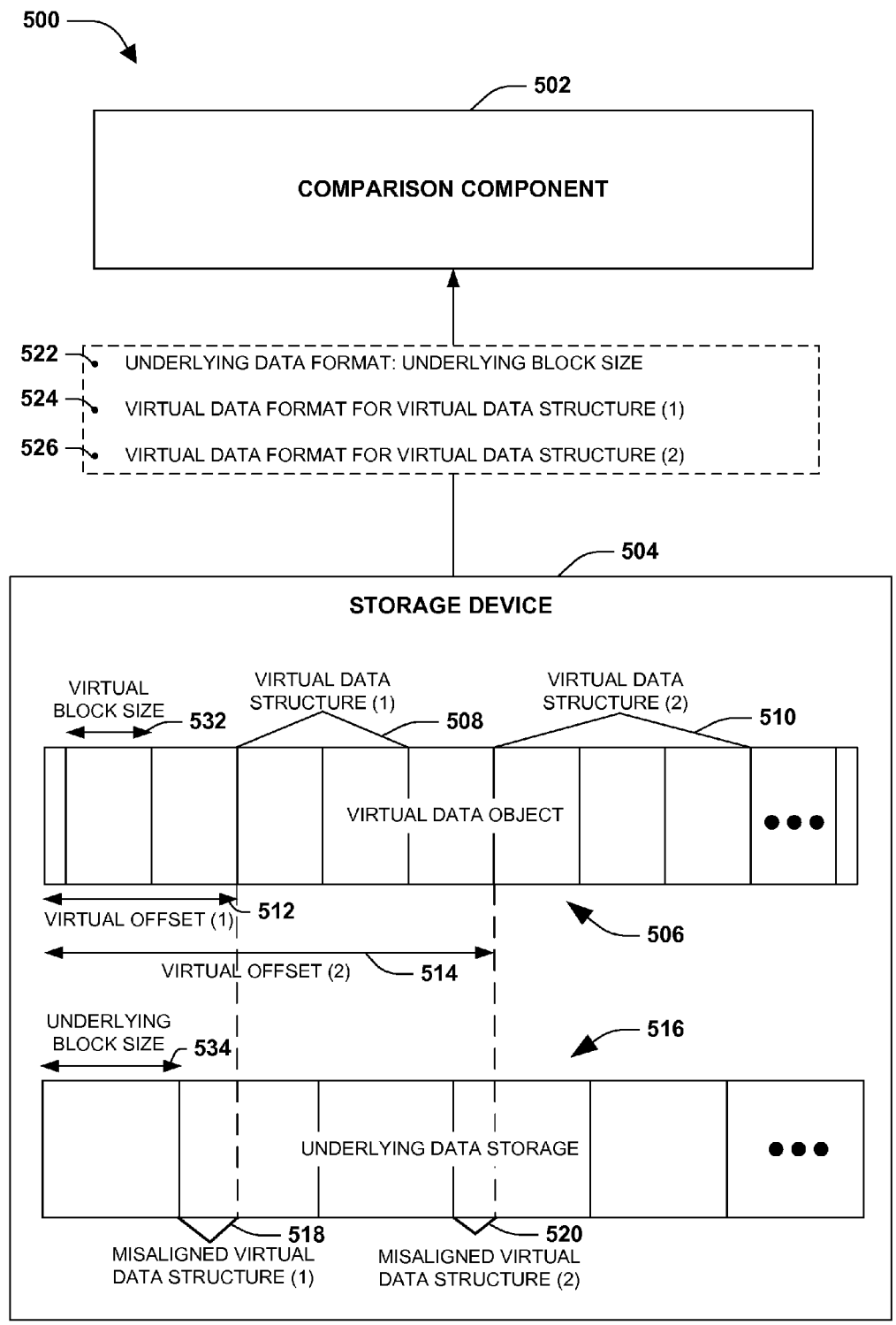
FIG. 5 is a component block diagram illustrating an exemplary system for detecting misalignment between a virtual data format and an underlying data format.

FIG. 5 illustrates an example of a system 500 configured to detect misalignment between a virtual data format and an underling data format. System 500 may comprise a comparison component 502. The comparison component 502 may be configured to detect misalignment of virtualized data within a virtual data object 506 stored on a storage device 504. The virtual data object 506 may comprise one or more virtual data structures, such as virtual data structure (1) 508 and/or virtual data structure (2) 510. The virtual data object 506 may be stored within underlying data storage 516 (e.g., physical storage and/or a LUN) of the storage device 504 according to an underlying data format 522 (e.g., an underlying block size 534 of 4096 bytes, an underlying offset, etc.).

The comparison component 502 may be configured to query metadata within the virtual data object 506 to determine a virtual data format of a virtual data structure. In one example, the comparison component 502 may open and read the virtual data object 506 using a virtualization application programming interface to locate bytes within the virtual data object 506 that describe how virtual partition (1) 508 and/or virtual partition (2) 510 are stored within the virtual data object 506 (e.g., a virtual machine application programming interface may be used to open and read a virtual hard disk data object of a virtual machine to locate a master boot record table describing how a virtual partition of the virtual machine is stored within the virtual hard disk data object). For example, a virtual block size 532 of 512 bytes and a virtual offset (1) 512 of 63 blocks may be determined as a virtual data format 524 for the virtual data structure (1) 508, and the virtual block size 532 of 512 bytes and a virtual offset (2) 514 of 182 blocks may be determined as a virtual data format 526 for the virtual data structure (2) 510 (e.g., the virtual offset (1) 512 may indicate that the virtual data structure (1) 508 starts at block 63, and the virtual offset (2) 514 may indicate that the virtual data structure (2) 510 starts at block 182 within the virtual data object).

The comparison component 508 may compare the virtual offsets and virtual block sizes of the respective virtual data structures with the underlying data format 522 to detect misalignment of the virtual data structures. In one example of detecting misalignment associated with the virtual data structure (1) 508, the comparison component 502 may determine a product of the virtual offset (1) 512 of 63 blocks and the virtual block size 532 of 512 bytes, and then compare (e.g., MOD) the resulting 32256 product with the underlying block size 534 of 4096 bytes to determine whether a remainder is produced. Because 32256 mod 4096 produces a remainder, misalignment 518 between the virtual data format 524 of the virtual data structure (1) 508 and the underlying data format 522 of the underlying data storage 516 may be detected. In another example of detecting misalignment associated with the virtual data structure (2) 510, the comparison component 502 may determine a product of the virtual offset (2) 514 of 182 blocks and the virtual block size 532 of 512 bytes, and then compare (e.g., MOD) the resulting 93184 product with the underlying block size 534 of 4096 bytes to determine whether a remainder is produced. Because 93184 mod 4096 producers a remainder, misalignment 520 between the virtual data format 526 of the virtual data structure (2) 510 and the underlying data format 522 of the underlying data storage 516 may be detected.

It may be appreciated that the comparison component 502 may be implemented local or remote to the virtual data object 506 and/or a host computing device that provides clients with access to the virtual data object. In one example, the comparison component 502 may be implemented within the storage device 504. In another example, the comparison component 502 may be implemented within a computing device remote from the storage device 504. In another example, the comparison component 502 may be comprised within a computing device remote from a host computing device configured to provide access to the virtual data object 506, such as a host computing device configured to host a virtual machine associated with the virtual data object 506. It may be appreciated that the comparison component 502 may open, read and/or access the virtual data object 506 irrespective of the state of the virtual data object 506. For example, if the virtual data object 506 is associated with a virtual machine, then the comparison component 502 may detect misalignment without directly accessing a hosted instance of the virtual machine, which may otherwise require credentials and/or the virtual machine to be in a particular state, such as a running or shutdown state.

Figure 6:
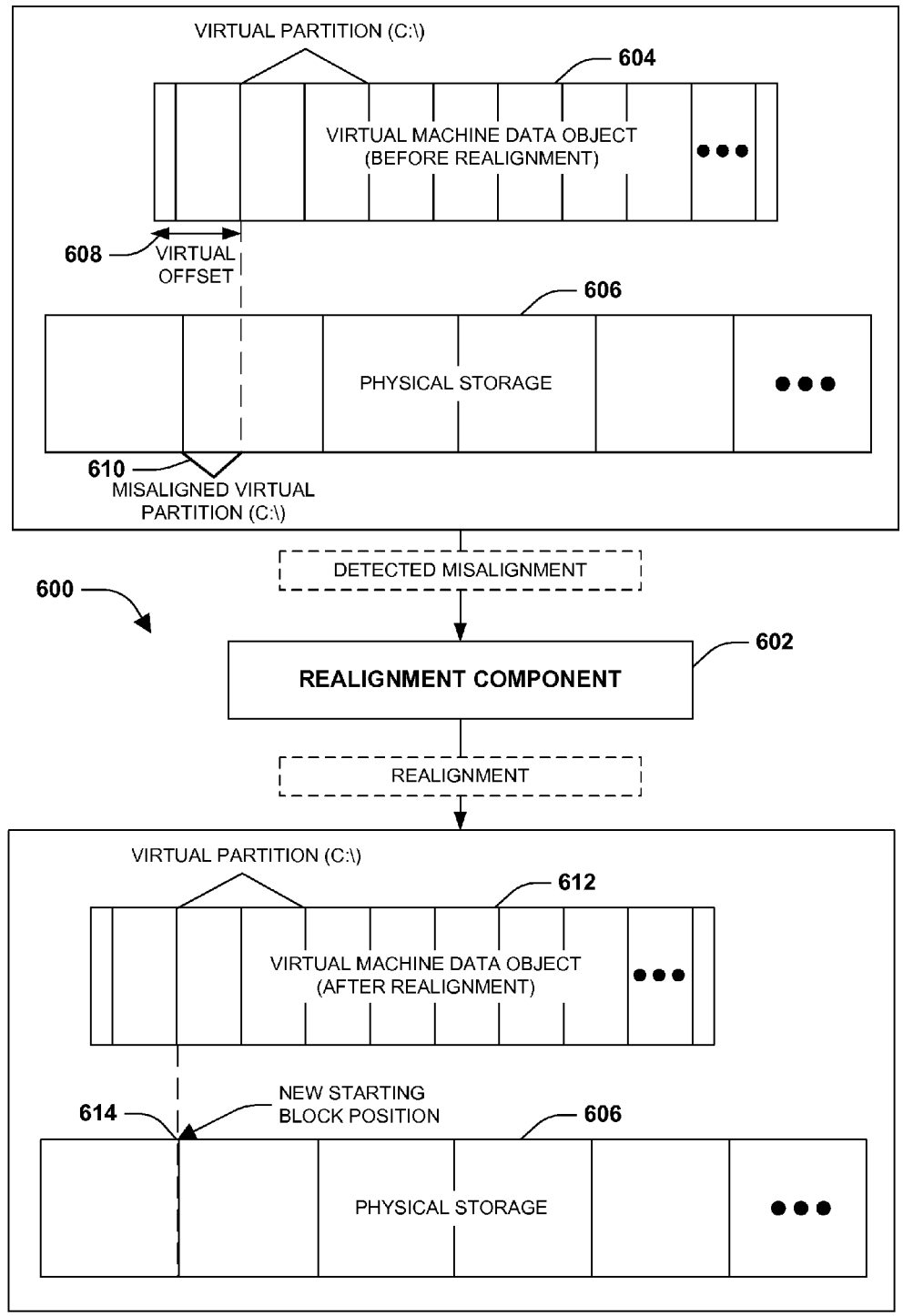
FIG. 6 is a component block diagram illustrating an exemplary system for realigning a virtual data structure within a storage device to correct misalignment.

FIG. 6 illustrates an example of a system 600 configured to realign a virtual data structure within a storage device to correct misalignment. System 600 may comprise a realignment component 602. The realignment component 602 may be configured to correct misalignment of virtualized data within a virtual data object stored on a storage device by realigning the virtual data structure and/or the virtual data structure to a new starting block position with the storage device to match an underlying data format of the storage device.

In one example of correcting misalignment, a virtual machine data object 604 (before realignment) may be associated with a virtual machine. For example, the virtual machine data object 604 may comprise virtual machine data, such as a guest operating system, application binaries and/or user data. The virtual machine data object 604 may store the virtual machine data within one or more virtual partitions (e.g., a virtual partition c:\ that may be used as a virtual hard disk (e.g., a c: drive) of the virtual machine to store data of the virtual machine). A virtual data format may be associated with the virtual partition c:\. For example, the virtual data format may comprise a virtual offset 608 of the virtual partition c:\ within the virtual machine data object 604 and/or a virtual block size.

The virtual machine data object 604 may be stored on physical storage 606 using an underlying data format. A comparison component (not illustrated) may be configured to detect misalignment 610 between the virtual data format of the virtual partition c:\ and the underlying data format of the physical storage 606. Accordingly, the realignment component 602 may be configured to realign the virtual partition c:\ and/or the virtual machine data object 604 within the physical storage 606 to a new starting block position 614 to alleviate the misalignment. For example, bytes of data within the virtual partition c:\ may be shifted to the new starting block position 614 on the physical storage 606. It may be appreciated that in one example, realignment of the virtual partition c:\ may comprise realigning the virtual machine data object 612 (after realignment) with the physical storage 606. It may be appreciated that other realignment techniques may be employed by the realignment component 602 to alleviate misalignment.

FIG. 7 illustrates an example 700 of a virtual partition 704 misaligned with a LUN 710 mapped to a storage device. A virtual machine data object 702 may comprise the virtual partition 704. The virtual partition 704 may be associated with a virtual data format describing how the virtual partition 704 is stored within the virtual data object 702. For example, the virtual data format may comprise a virtual block size 706, a virtual offset 708 and/or other formatting information.

The virtual machine data object 702 may be stored on the LUN 710 mapped to the storage device. The LUN 710 may be associated with an underlying data format describing how data is stored within the LUN 710. For example, the underlying data format may comprise an underlying block size 712 and/or other formatting information. A comparison component (not illustrated) may be configured to detect misalignment 714 between the virtual data format and the underlying data format. In particular, the comparison component may detect misalignment 714 associated with how the virtual partition 704 is stored on the LUN 710. For example, data blocks of the virtual partition 704 may not align with data blocks of the LUN 710 (e.g., a starting data block of the virtual partition 704 may not start at the beginning of a data block of the LUN 710). Thus, accessing a virtual data block of the virtual partition 704 may entail accessing more than one underlying data block of the LUN 710, which may reduce performance of a virtual machine associated with the virtual machine data object 702. It will be appreciated that, in one example, such misalignment may be addressed in a manner akin to that which is illustrated in FIG. 6, for example.

FIG. 8 illustrates an example 800 of a LUN partition 804 misaligned with physical storage 810 of a storage device. A LUN 802 may comprise the LUN partition 804. The LUN partition 804 may be associated with a virtual data format describing how the LUN partition 804 is stored within the LUN 802. For example the virtual data format may comprise a virtual block size 806, a LUN offset 808 (e.g., a virtual offset of a LUN), and/or other formatting information.

The LUN 802 may be stored on the physical storage 810. The physical storage 810 may be associated with an underlying data format describing how data is stored within the physical storage 810. For example, the underlying data format may comprise an underlying block size 812 and/or other formatting information. A comparison component (not illustrated) may be configured to detect misalignment 814 between the virtual data format and the underlying data format. In particular, the comparison component may detect misalignment 814 associated with how the LUN partition 804 is stored on the physical storage 810. For example, data blocks of the LUN partition 804 may not align with data blocks of the physical storage 810 (e.g., a starting data block of the LUN partition 804 may not start at the beginning of a data block of the physical storage 810). Thus, accessing a virtual data block of the LUN partition 804 may entail accessing more than one underlying data block of the physical storage 810, which may reduce I/O performance to data of the LUN partition 804. It will be appreciated that, in one example, such misalignment may be addressed in a manner akin to that which is illustrated in FIG. 6, for example.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Figure 9:
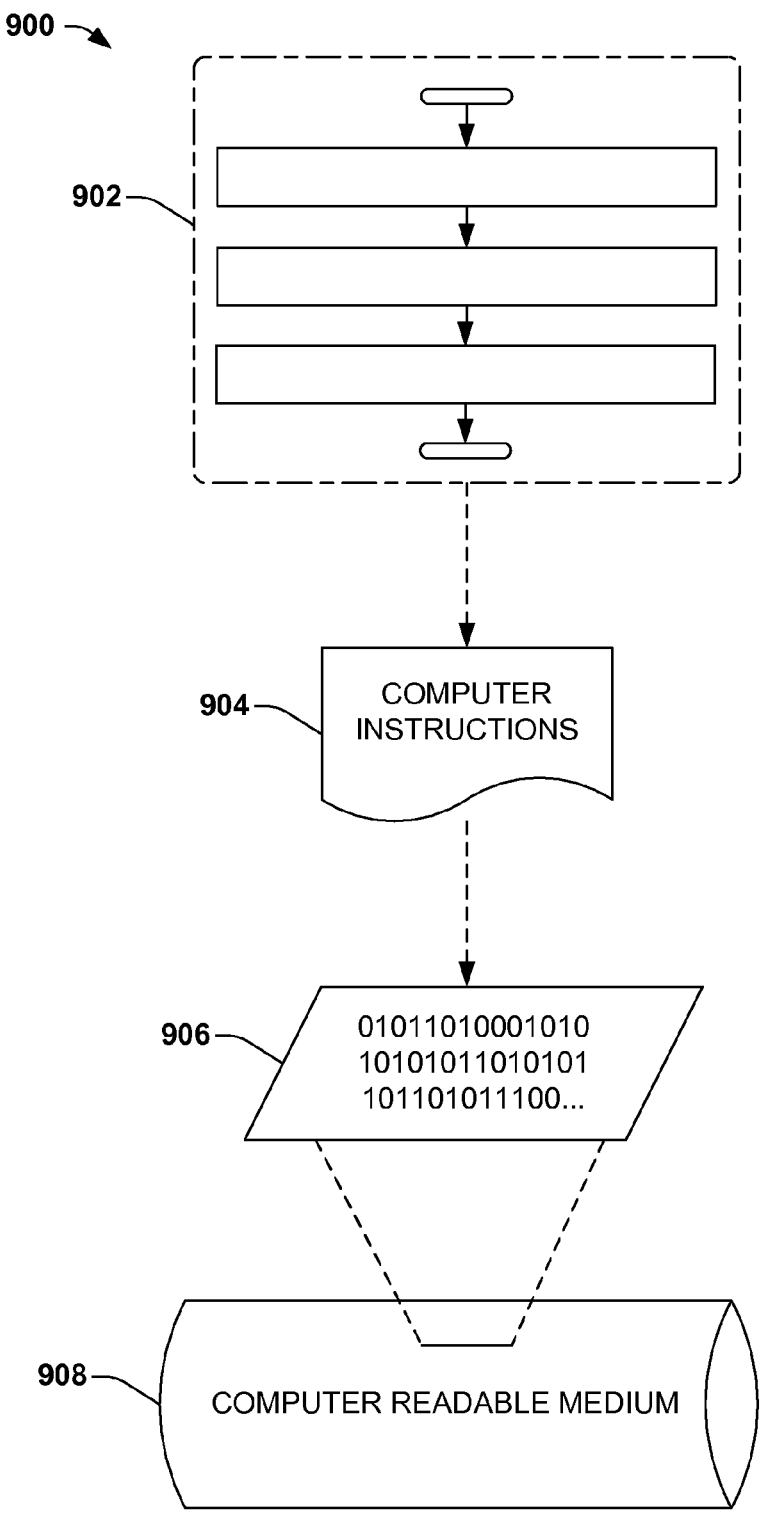
FIG. 9 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 9, where the implementation 900 comprises a computer-readable medium 908 (e.g., a CD-R, DVD-R, platter of a hard disk drive, flash drive, etc.), on which is encoded computer-readable data 906. This computer-readable data 906 in turn comprises a set of computer instructions 904 configured to operate according to the principles set forth herein. In one such embodiment, the processor-executable instructions 904 may be configured to perform a method 902, such as at least some of the method 300 of FIG. 3 or method 400 of FIG. 4, for example, and/or at least some of a system, such as at least some of the system 500 of FIG. 5, for example. Many such computer-readable media may be devised by those of ordinary skill in the art that are configured to operate in accordance with the techniques presented herein.

Although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Furthermore, to the extent that the terms "includes", "having", "has", "with", or variants thereof are used in either the detailed description or the claims, such terms are intended to be inclusive in a manner similar to the term "comprising." Also, "exemplary" means an example, not the best; "or" is intended to be inclusive not exclusive; "a" and/or "an" mean "one or more" unless specified otherwise and/or clear from context to be directed to a singular form; and at least one of A and B and/or the like generally means A or B or both A and B.

What is claimed is:

1. A method for detecting misalignment between a virtual data format and an underlying data format within a virtualized storage environment, comprising:
    querying metadata within a virtual data object to determine a virtual data format of a virtual data structure within the virtual data object, the virtual data format comprising a virtual block size and virtual offset of the virtual data structure, the virtual data object stored within a storage device using an underlying data format; and
    determining whether a product, determined by a multiplication operation of the virtual block size and the virtual offset, as compared to an underlying block size of the underlying data format produces a remainder, the remainder indicative of misalignment of the virtual data structure.

2. The method of claim 1, the virtual data object comprising a virtual machine data object associated with a virtual machine, the virtual data structure comprising a virtual partition of the virtual machine, and the underlying data format corresponding to physical storage of the storage device.

3. The method of claim 2, comprising:
    receiving a virtualization discovery report from a virtual machine management platform, the virtualization discovery report specifying that the virtual machine data object is associated with the virtual machine; and
    opening the virtual machine data object using a virtual machine application programming interface on the storage device, the virtual machine application programming interface configured to open and read virtual machine data objects.

4. The method of claim 1, the virtual data object comprising a virtual machine data object associated with a virtual machine, the virtual data structure comprising a virtual partition of the virtual machine, and the underlying data format corresponding to a logical unit number (LUN) mapped to the storage device.

5. The method of claim 1, the virtual data object comprising a logical unit number (LUN), the virtual data structure comprising a LUN partition, and the underlying data format corresponding to physical storage of the storage device.

6. The method of claim 1, the metadata comprising at least one of:
    a master boot record;
    a global unique ID (GUID) partition table; or
    a range of bytes within the virtual data object comprising a metadata table.

7. The method of claim 1, the querying metadata comprising:
    querying the metadata within the virtual data object to determine at least two virtual data structures; and
    for respective virtual data structures, determining a virtual data format comprising a virtual block size and a virtual offset of a virtual data structure.

8. The method of claim 1, the determining comprising:
    performing a modulus operation to determine whether the remainder is produced from a division operation of the product and the underlying block size.

9. The method of claim 1, comprising:
    if a misalignment is detected, then realigning the virtual data structure to a new starting block position within the storage device to match the underlying data format.

10. The method of claim 1, the querying metadata comprising:
    querying a metadata table within a first portion of the virtual data object to determine a second portion, different than the first portion, of the virtual data object specifying the virtual data format of the virtual data structure.

11. A method for detecting misalignment between a virtual data format and an underlying data format within a virtualized storage environment, comprising:
    querying metadata within a virtual machine data object associated with a virtual machine to determine a virtual data format of a virtual partition within the virtual machine data object, the virtual data format comprising a virtual block size and a virtual offset of the virtual partition, the virtual machine data object stored on a storage device using an underlying data format comprising a physical data format of physical storage of the storage device; and
    determining whether a product, determined by a multiplication operation of the virtual block size and the virtual offset, as compared to an underlying block size of the underlying data format produces a remainder to detect misalignment of the virtual partition in relation to the underlying data format.

12. The method of claim 11, comprising:
    if a misalignment is detected, then realigning the virtual partition to a new starting block position within the storage device to match the underlying data format.

13. A system for detecting misalignment between a virtual data format and an underlying data format within a virtualized storage environment, comprising:
    one or more processors; and
    memory that when executed by at least one of the one or more processing units perform operations, comprising:
        querying metadata within a virtual data object to determine a virtual data format of a virtual data structure within the virtual data object, the virtual data format comprising a virtual block size and virtual offset of the virtual data structure, the virtual data object stored within a storage device using an underlying data format; and
        determining whether a product, determined by a multiplication operation of the virtual block size and the virtual offset, as compared to an underlying block size of the underlying data format produces a remainder, the remainder indicative of misalignment of the virtual data structure, the determining comprising performing a modulus operation to determine whether the remainder is produced from a division operation of the product and the underlying block size.

14. The system of claim 13, the virtual data object comprising a virtual machine data object associated with a virtual machine, the virtual data structure comprising a virtual partition of the virtual machine, and the underlying data format corresponding to physical storage of the storage device.

15. The system of claim 13, the virtual data object comprising a virtual machine data object associated with a virtual machine, the virtual data structure comprising a virtual partition of the virtual machine, and the underlying data format corresponding to a logical unit number (LUN) mapped to the storage device.

16. The system of claim 13, the virtual data object comprising a logical unit number (LUN), the virtual data structure comprising a LUN partition, and the underlying data format corresponding to physical storage of the storage device.

17. The system of claim 13, the operations comprising:
if a misalignment is detected, then providing notification of the misalignment.

18. The system of claim 13, the operations comprising:
if a misalignment is detected, then realigning the virtual data structure to a new starting block position within the storage device to match the underlying data format.

19. The system of claim 13, the operations comprising:
identifying the metadata within a master boot record within the virtual data object.

20. The system of claim 13, the querying comprising:
querying the metadata while the virtual data object is in a running state.

* * * * *